United States Patent [19]
Pau et al.

[11] Patent Number: 5,838,597
[45] Date of Patent: Nov. 17, 1998

[54] MPEG-2 DECODING WITH A REDUCED RAM REQUISITE BY ADPCM RECOMPRESSION BEFORE STORING MPEG-2 DECOMPRESSED DATA

[75] Inventors: Danilo Pau, Sesto San Giovanni; Roberto Sannino, Bergamo, both of Italy

[73] Assignee: SGS-Thomson Microelectronics S.r.l., Agrate Brianza, Italy

[21] Appl. No.: 758,805

[22] Filed: Dec. 3, 1996

[30] Foreign Application Priority Data

Dec. 4, 1995 [EP] European Pat. Off. .............. 95830504
Mar. 11, 1996 [EP] European Pat. Off. .............. 96830106

[51] Int. Cl.⁶ ..................................................... G06F 17/00
[52] U.S. Cl. ................................ 364/715.02; 395/200.77
[58] Field of Search ................ 395/200.77; 364/715.02; 345/202; 348/402, 409, 415, 416, 410; 369/60; 341/107

[56] References Cited

U.S. PATENT DOCUMENTS

| | | | |
|---|---|---|---|
| 5,473,377 | 12/1995 | Kim | 348/405 |
| 5,508,949 | 4/1996 | Konstantinides | 348/415 |
| 5,611,038 | 3/1997 | Shaw et al. | 395/200.51 |
| 5,668,599 | 9/1997 | Cheney et al. | 348/409 |
| 5,671,204 | 9/1997 | Yokouchi et al. | 369/60 |
| 5,679,912 | 10/1997 | Asai et al. | 369/60 |
| 5,717,394 | 2/1998 | Schwartz et al. | 341/107 |

FOREIGN PATENT DOCUMENTS

0 696 874 A  2/1996  European Pat. Off. .

OTHER PUBLICATIONS

Rosemont, *Institute of Electrical and Electronics Engineers,* "An Integrated MPEG–1 and MPEG–2 Decoder", pp. 324–325, Jun. 21, 1994.

D. J. LeGall, *Signal Processing: Image Communication,* "The MPEG Video Compression Algorithm", pp. 137–139, vol. 4, No. 2, Apr. 1, 1992.

*Primary Examiner*—Ellis B. Ramirez
*Attorney, Agent, or Firm*—Allen, Dyer, Doppelt, Milbrath & Gilchrist, P.A.

[57] ABSTRACT

The video RAM requisite of an MPEG-2 decoder is reduced by recompressing according to an adaptive pulse code modulation scheme (ADPCM) at least the I and P pictures, after MPEG-2 decompression and before storing the relative data in the video RAM. The ADPCM recompressed and coded data written in the video RAM are decoded and decompressed during the reconstruction of a B-picture to be displayed.

10 Claims, 8 Drawing Sheets

☐ UNCOMPRESSED PEL

MPEG-2 DECODING WITH A REDUCED RAM REQUISITE BY ADPCM RECOMPRESSION BEFORE STORING MPEG-2 DECOMPRESSED DATA

FIELD OF THE INVENTION

The present invention relates to an integrated video decoder based on the use of the MPEG compression algorithm and more in particular according to a second and more advanced version of the MPEG-1 standard called MPEG-2, having a reduced requisite of video memory.

BACKGROUND OF THE INVENTION

The MPEG-1 standard was developed in response to the industry need of implementing an efficient way of storing and retrieving video information on digital storage media, as for example CD-ROMs. Of course, the MPEG-1 standard is also a powerful tool for efficiently storing data on similar media such as DATS, Winchester disks, optical disks and ISDN and LAN networks. A more efficient version of the standard, called MPEG-2 has been developed in support of bitrate requirements in the field of digital video transmission applications. The standard has been generally accepted for digital TV systems, for compressing TV-resolution pictures, entirely interlaced, up to a bitrate of about 15 Mbps.

A special version of the MPEG-2 standard is expected to be used in future generation HDVT systems. The MPEG standard incorporates and utilizes important algorithms and criteria defined by previous international standards, such as for example, the CCITT motion vectors determination algorithm H.261 and the ISO 10918 standard of the ISO JPEG Committee for the coding of still pictures. A definition of the MPEG standard (1 and 2), as well as an exhaustive description of the different techniques of implementation and the relative coding and decoding systems of the data pertaining to compressed video pictures according to the MPEG standards are described in a wealth of articles and publications on the subject, among which the following can be mentioned:

Draft International ISO/IEC DIS 13818-2 "Information technology—Generic coding of moving pictures and associated audio information";

"MPEG coding and transport system" by Leonardo Chiariglione, Digital Television Broadcasting—Proceedings;

"The MPEG video compression algorithm" by Didier J. Le Gall, Signal Processing Image Communication, Elsevier Science Publishers B.V., Vol. 4, No. 2, April 1992;

Digest No. 1995/012, Electronics Division, Institution of Electrical Engineers—London, Colloquium on: "MPEG-2—what it is and what it isn'2";

"An Overview of the MPEG Compression Algorithm" Technical Note released by SGS-THOMSON MICROELECTRONICS (An 529/0294);

Datasheet "STi3500A" Datasheet of SGS-THOMSON MICROELECTRONICS; and

"STi3520A—Advanced Information for an MPEG Audio/MPEG-2 Video Integrated Decoder" (June 1995).

According to a typical architecture of an MPEG-2 decoder, such as that shown in FIG. 3 of the publication No. STi3520A relative to an MPEG Audio/MPEG-2 Video integrated decoder marketed by SGS-THOMSON MICROELECTRONICS there exist well defined requisites of video memory, that is, of capacity of an external DRAM memory that, for a PAL and NTSC application, capable of supporting 16 Mbits PAL video signals, can be estimated as follows. Considering that both the MPEG-2 video decoder and the MPEG audio decoder access a unique external DRAM memory of 16 Mbits through a common interface, the audio decoder may require access to only 131,072 bits leaving the remaining 16,646,144 bits available for satisfying the requisites of the MPEG-2 video decoder. The video memory can be configured as follows:

A "Bit buffer": that is a buffer for compressed data that the MPEG-2 standard fixes at 1.75 Mbits plus an extra amount, for example of 983.040 bits, in consideration of a non-ideal process of decompression actually being implemented;

A first "I-frame buffer" for the decompressed Intra-picture or briefly I-picture, in a 4:2:0 format;

A second "P-frame buffer" for the decompressed Predicted-picture or briefly P-picture, in a 4:2:0 format; and A third "B-frame buffer" for the decompressed Bidirectionally Predicted Picture or briefly B-picture, in a 4:2:0 format, eventually optimized so to require a reduced amount of memory, that is of 0.7407 or 0.6111 of a frame respectively in the case of a PAL or NTSC system.

According to the present MPEG-2 standard technique, and regardless of whether dealing with an I, P or B-picture, depending on the type of video standard, each "frame buffer" in the 4:2:0 format may occupy an amount of memory given by the following table.

|      |                                           |                |           |
| ---- | ----------------------------------------- | -------------- | --------- |
|      | 720x576x8 for the luma (luminance) (Y)    | 3,317,760 bits |           |
| PAL  | 360x288x8 for the U chroma (chrominance U)| 829,440 bits   | = 4,976,640 |
|      | 360x288x8 for the V chroma (chrominance V)| 829,440 bits   | bits      |
|      | 720x480x8 for the luma (luminance) (Y)    | 2,764,800 bits |           |
| NTSC | 360x240x8 for the U chroma (chrominance U)| 691,200 bits   | = 4,147,200 |
|      | 360x240x8 for the V chroma (chrominance V)| 691,200 bits   | bits      |

Therefore, in the case of a PAL system, which representing the most burdensome case may serve as a reference example, the actual total amount of memory required will be given by:

1,835,008+835,584+4,976,640+4,976,640+(4,976,640*0,7407)=16,310,070 bits.

This calculation takes into account a 0.7407 optimization of the B-picture frame buffer.

A further optimization may consist in carrying out the decompression of the B-picture without resorting to a storage step in the external RAM by carrying out an equivalent function internally in the integrated decoder device by a dedicated circuit block functionally placed upstream of the Display Unit. Considering this further optimization, the video RAM requirement drops to:

1,835,008+835,584+4,976,640+4,976,640=12,623,872 bits where the B-buffer is realized within the same chip containing the "core" of the decoder being required to convert the scanning of each 8*8 block, defined in the MPEG-2 compressed data stream, in that of each row of the picture (field or frame) required by the video display process of the picture itself. Such conversion macrocell is commonly referred to as "MACROBLOCK TO RASTER SCAN CONVERTER".

SUMMARY OF THE INVENTION

In view of the above-indicated present limits of optimization of the static memory requisites of an MPEG-2 decoder, a method and a relative system of implementation has now been found and represents the object of the present invention allowing for a significant reduction of the memory requisite.

The concept of the present invention is based on the recognition that the amount of memory required by the decoding process, resulting from the above stated calculations, can be significantly reduced when allowing for a recompression of the pictures used as a reference for the prediction (I-picture and P-picture for the case of the standards MPEG-1 and MPEG-2), subsequent to the MPEG decompression and before they are stored in the external video memory and their decompression when they are read by the external memory. Basically, the method of the invention preferably comprises recompressing at least the I-pictures and the P-pictures while assuming that the decompression of the B-pictures can be made without recourse to a storage phase by employing a "Macroblock scan to raster scan" conversion buffer of the B-pictures, after the MPEG-2 decompression and before sending the pictures to the Display Unit. Such an I and P picture recompression phase is carried out according to an adaptive differential pulse code modulation (ADPCM) scheme.

According to one of aspect of the present invention, the ADPCM recompression of the I and P pictures is in response to the following requisites:

effectiveness: the amount of memory occupied by the compressed pictures added to that used for carrying our their decompression is lower than the total memory used for decoders not requiring said ADPCM recompression.

efficiency:
(1) the recompression of the pictures is carried out in a simple manner so that the total cost of the device does not increase sharply if compared to the saving deriving from not using part of the memory;
(2) the quality of the reconstructed pictures undergoes a negligible degradation or in any case acceptable in terms of cost/quality;
(3) optionally and preferably the number of the primary clock cycles, that regulates the functioning of the external memory, required to draw from this external memory the predictor for the motion compensation process can be advantageously reduced. To obtain this and according to a preferred embodiment, a part of the compressed information is stored in the chip of the decoder's "core", in a dedicated buffer as hereinbelow illustrated.

In practice, a recompression according to the ADPCM scheme is carried out on the data pertaining to the chrominance and luminance blocks, as output by the discrete cosine inverse transform processing circuit of the MPEG-2 decompression block (for the I-pictures and, after motion, for the P-pictures) by coding the data, for example, according to a four bit compression of luminance blocks (e.g. of 8*8 pixels each) and a three bit compression of chrominance blocks (e.g. of 8*8 pixels each). Optionally, each block of n*m pels of luminance and/or chrominance U and V may also be preventively subdivided into two subblocks of (n/2)*m pels thus carrying out the process of ADPCM compression coding, writing in the memory, reading from the memory, decoding, and ADPCM decompressing on such data subblocks.

The ADPCM compression method of the invention, as explained below, fulfills the above stated requisites. In addition, a certain degree of flexibility in compressing is provided to allow relatively simple modification of the coding and decoding circuits in case they are desirably optimized for a different level of compression. In the present context, the abbreviation "pel" is after used in place of "pixel".

According to an aspect of the invention, a video decoder MPEG-2, interfacing with a control bus and a video data processing bus pertaining to video pictures to be written in and read from respective storage buffers, may comprise typically a first buffer of the "first-in-first-out" type for the acquisition and writing of compressed data in a respective first buffer for video bits of an external DRAM memory, a detecting circuit of a picture initial code synchronized by a control circuit, a bi-directional buffer for storing on-screen display (OSD) data, a variable length decoding block of the compressed input data stream, a decompression block of the data decoded by said variable length decoding block comprising a "run-length" type decoding stage, a circuit performing an inverse quantization function, a processing circuit of the inverse discrete cosine transform (I_DCT) and a predictor value generation network. The circuit also preferably further comprises: a circuit for coding and recompressing according to an adaptive differential pulse coding modulation (ADPCM) scheme the decompressed I and P pictures, encoding the I_DCT block output data which, after motion compensation, are written in the respective buffers by the external memory; and a circuit for decompressing and decoding the output (ADPCM) data from the I_DCT block relative to the I and P pictures so recompressed, read from the respective buffers of the external memory, capable of generating a video data stream relative to the I and P pictures to be sent to an external video display unit, in conjunction with the output data of the I_DCT block relative to the decompressed B-pictures.

According to an embodiment of the invention, the coding and recompressing circuit may comprise: an acquisition buffer of the decompressed I_DCT data produced by the MPEG decompression block; a circuit capable of assessing the energy content of the buffer and generating a digital variance value of the pel values of the different data blocks output by the I_DCT block to be stored in the respective buffer of the external memory; and a multilevel quantizer, coherently conditioned by the actual or current digital variance value generated by said circuit. This embodiment also preferably includes:

a differentiator capable of receiving through a first input the I_DCT data stream produced by the MPEG decompression block and, through a second input, a predictor value and of producing an output data stream to be sent to the input of said quantizer;

a coding and write circuit of the recompressed data in the respective buffers of the external memory capable of receiving as an input the output stream of the quantizer;

a network for the generation of said predictor value comprising a multiplexer capable of receiving through a first input the I_DCT input data stream and through a second input the predictor value generated by the network;

an adder capable of receiving through a first input the output stream of the quantizer, through a second input the data output by said multiplexer and of producing an output stream of sum data; and a limiter circuit capable of receiving as an input said sum data stream produced by said adder and followed in cascade by a circuit that generates said predictor value which is supplied to the second input of the differentiator and of the multiplexer.

The decompressing and decoding circuit can be provided by a decoding circuit capable of receiving through a first input a compressed and coded data stream coming from the respective external memory buffers, and receiving through a second input the relative variance value previously stored in the same external memory buffers; and by a decompression network including an adder summation stage capable of receiving through a first input the decoded data stream output by said decoding circuit, and receiving through a second input the predictor value relative to the decompressed pel value, already generated at the output of the adder, followed by a limiter of the pixel values.

Of course, the dimensions in pels of the luminance and chrominance blocks of data, the format of the I_DCT data according to the MPEG-2 compression scheme, the format of the recompression data of the already decompressed I and P pictures according to the ADPCM scheme, as contemplated by the invention, as well as the format of the estimated digital variance value and the number of levels of the relative quantizer can be different from those indicated by way of example in the present description and will normally be defined on the basis of design choices of the video decoder or of the receiver.

BRIEF DESCRIPTION OF THE DRAWINGS

The various aspects and relative advantages of the invention will be even more evident through the following description and by referring to the attached drawings, wherein.

DETAILED DESCRIPTION OF THE PREFERRED EMBODIMENTS

The sample embodiment shown in the figures refers to an MPEG-2 video decoder usable in PAL and NTSC applications, capable of supporting 16 Mbits PAL and that starting from such a requisite is able to significantly reduce the dimensions of the required video RAM.

Figure 1:
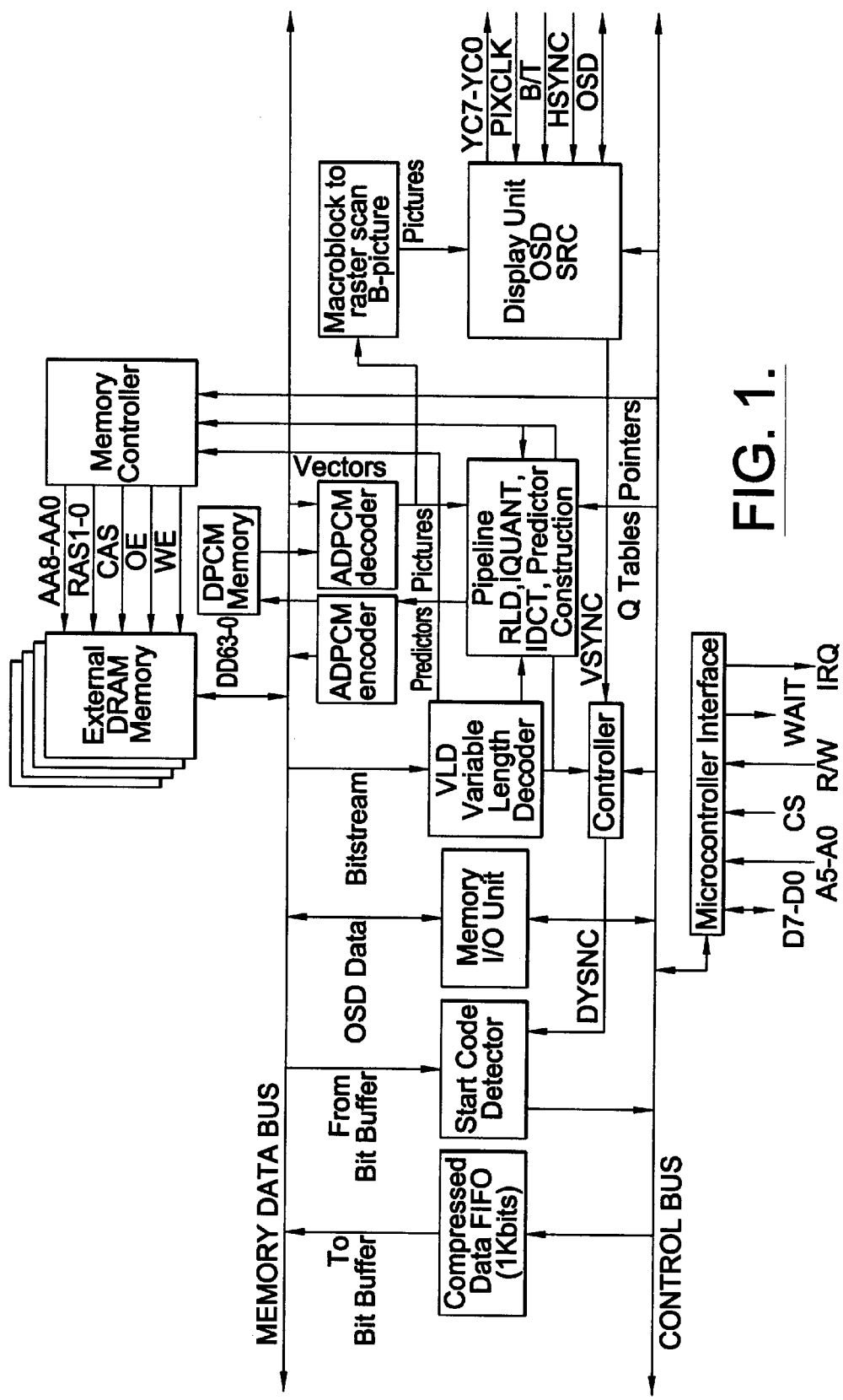
FIG. 1 is a block diagram of the "core" of a video decoder according a preferred embodiment of the present invention.

According to the architecture shown in FIG. 1, the MPEG-2 video decoder ("video core" of the integrated system) accesses an EXTERNAL DRAM MEMORY through an interfacing MEMORY DATA BUS, which can be shared also by an MPEG audio decoder core (not shown) for accessing a respective audio buffer that may be organized in the same external DRAM. Besides interfacing with the MEMORY DATA BUS, the video decoder core also interfaces with a CONTROL BUS, through which a system's control microprocessor intervenes through the interfacing block, MICROCONTROLLER INTERFACE. The video decoder may also include a controller (CONTROLLER) for the management synchronisms: DSYNC and VSYNC.

According to a conventional MPEG-2 architecture, the decoder comprises a "first-in-first-out" buffer COMPRESSED DATA FIFO, for instance with a capacity of 1 Kbits for the acquisition and the writing of compressed data in a first buffer, bit buffer, of the external DRAM, a START CODE DETECTOR, a memory bi-directional buffer MEMORY I/O UNIT for on screen display (OSD), a first variable length decoder (VLD) block for the compressed input data stream (BIT STREAM). The MPEG-2 DCT data decompression is carried out by the relative decompression block (PIPELINE-RDL, I_QUANT, I_DCT, PREDICTOR CONSTRUCTION). The pipeline typically includes a "run-length" decoding stage (RDL), an inverse quantization circuit (I_QUANT), an inverse discrete cosine transform processor (I_DCT) and a network for the generation or construction of a predictor value (PREDICTOR CONSTRUCTION).

In a known architecture, the blocks of I_DCT data output by the I_DCT processing circuit that calculates the inverse discrete cosine transform and the motion compensation, relative to the I, P and B pictures, were written in the respective buffers of the external memory in a coded form, that is, in the form of words of a certain number of bits before being decoded and sent to the display unit. By contrast, according to the present invention, the decompressed I_DCT data relative to the I and P pictures are recompressed according to an ADPCM scheme before being coded and written in the respective buffer of the external memory. This is affected by means of a dedicated block, ADPCM CODER. The recompressed data are thereafter decoded and decompressed by means of the ADPCM DECODER block in order to be sent, together with decompressed B-pictures, to the display unit. Optionally, an internal auxiliary memory (ADPCM Memory) may be realized to optimize the management of the external memory as described below. In one preferred case of a "direct" reconstruction of the B-pictures this is then realized as follows: the ADPCM compressed I and P predictors are read by the external DRAM memory and ADPCM decompressed in order to perform motion compensation of the B-picture that is currently being MPEG-2 decompressed by the "pipeline".

The macroblocks of I_DCT data so reconstructed are sent to the conversion circuit "MACROBLOCK TO RASTER SCAN", that precedes the DISPLAY UNIT in the diagram shown in FIG. 1 and they are then displayed. This procedure does not require any buffer in the external memory destined to store the B-picture, because such a buffer is present in the macrocell "MACROBLOCK TO RASTER SCAN CONVERTER B-picture".

Figure 2:
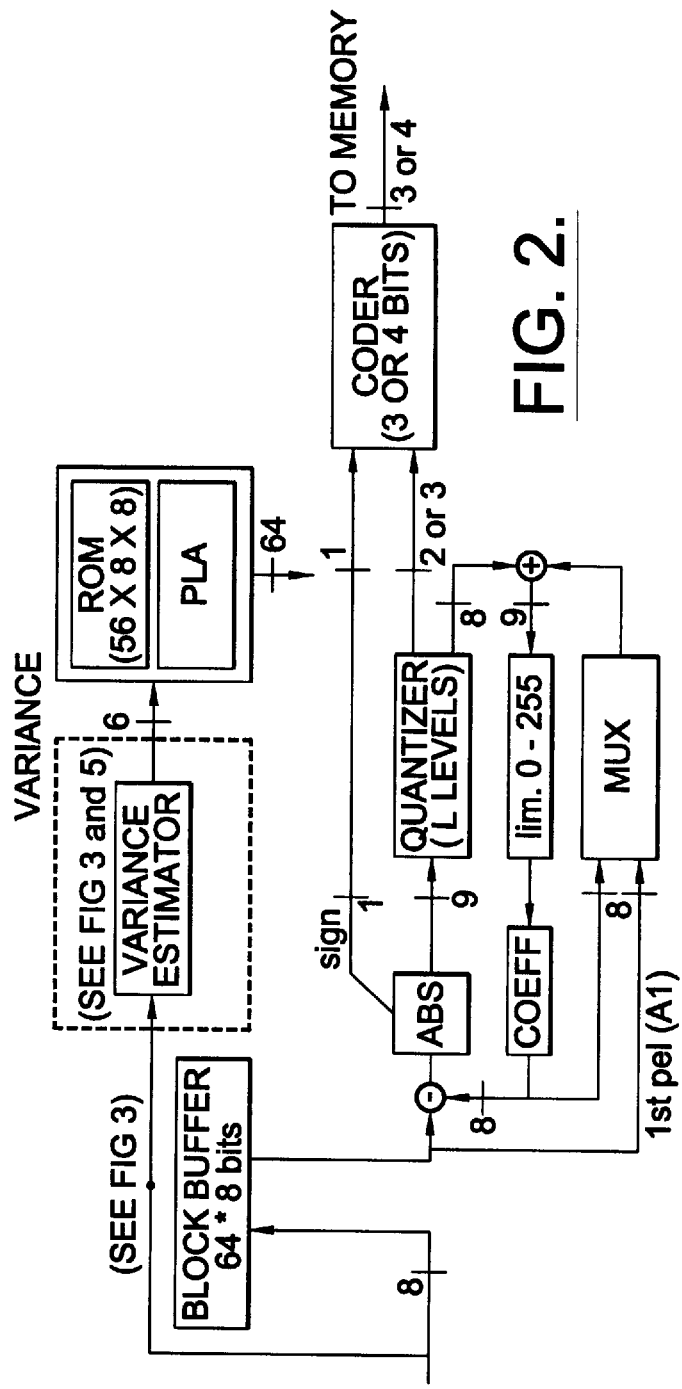
FIG. 2 shows the scheme of the ADPCM recompressing and coding circuit.

FIG. 2 illustrates a detail of the recompression block of the diagram of FIG. 1 from the data output by the I_DCT block (often indicated as I_DCT data for the sake of brevity) relative to the decompressed I and P pictures. Referring to FIG. 2, the ADPCM CODER block comprises a 64*8 bit buffer (BLOCK BUFFER) for the acquisition of the I_DCT input data. A dedicated circuit (VARIANCE ESTIMATOR) calculates the average pels value of each sub-block of the I_DCT input data and the average of the sum of the absolute values of the differences between each pel of the I_DCT data sub-block. With such parameters it is possible to assess the variance of the input data (pels) block.

Figure 3:
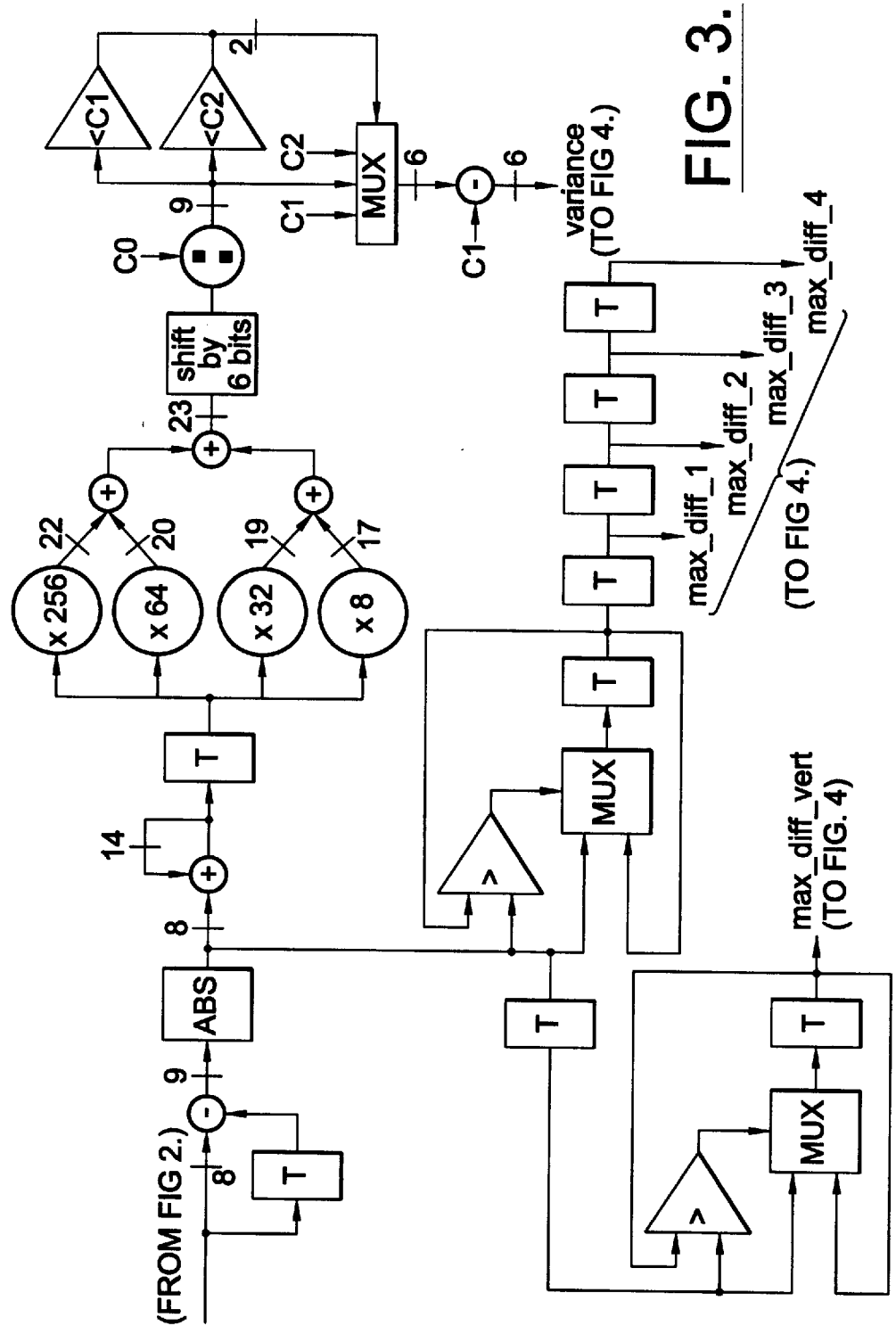
FIG. 3 and 4 shows a detailed functional scheme of the variance prediction block of the scheme of FIG. 2.
Figure 4:
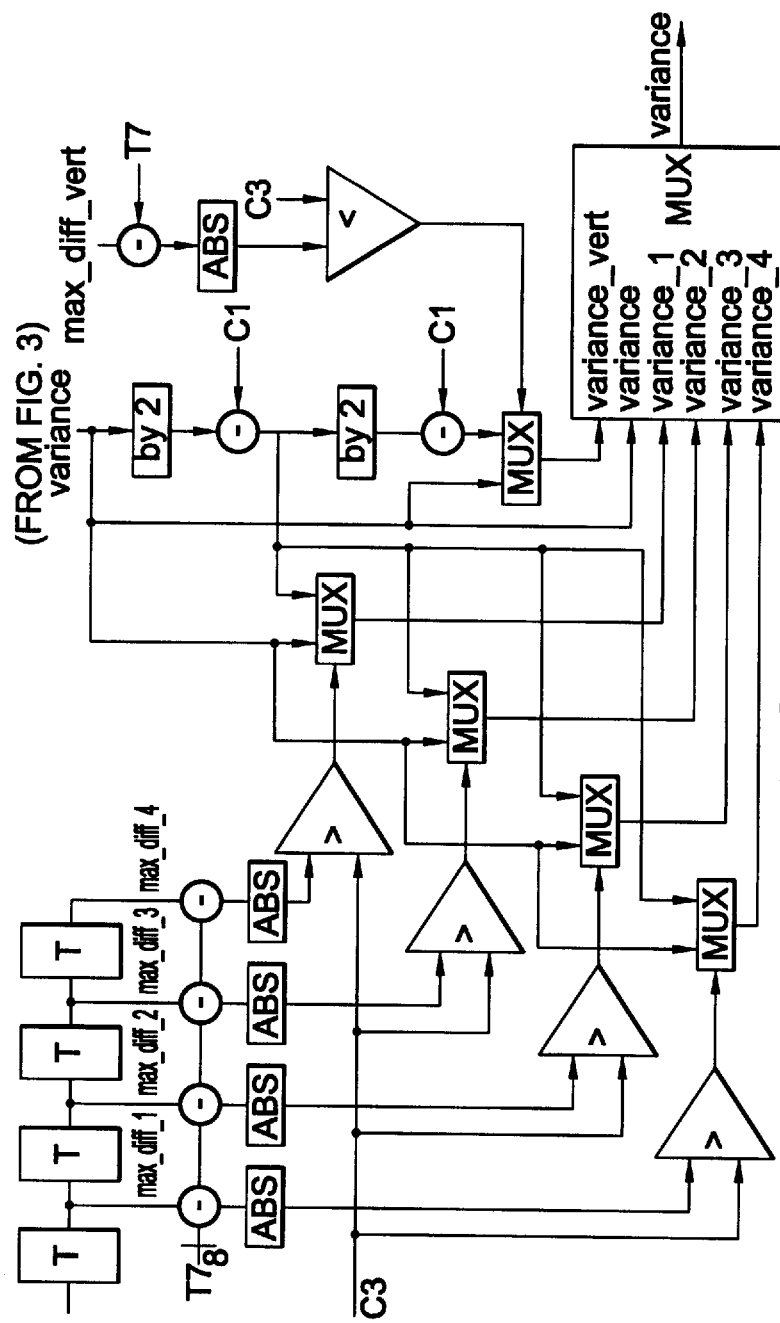

FIGS. 3 and 4 show a detailed functional scheme of the variance prediction block according to a preferred embodiment. The detailed scheme of FIGS. 3 and 4 of the variance predictor block makes use of a standard terminology as would be readily understood by a person skilled in the art. A further definition and description of each of the stages of the circuital block of the variance estimation is not considered necessary for comprehension of the architecture of the present invention by those of skill in the art.

Figure 6:
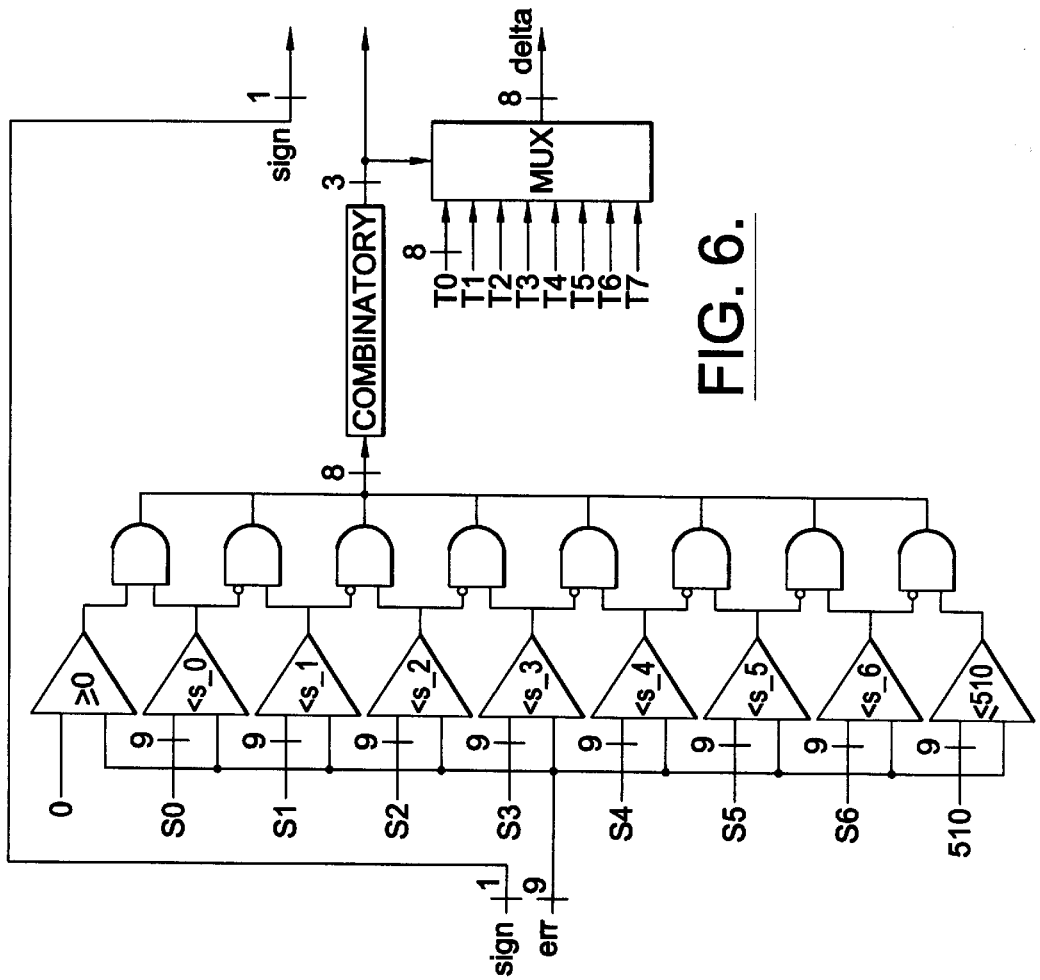
FIG. 6 is a functional scheme of a multilevel quantization circuit.
Figure 5:
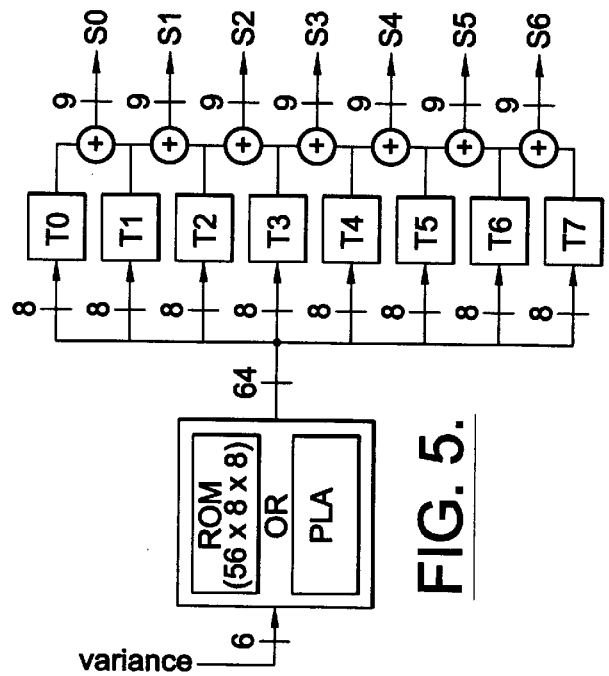
FIG. 5 is a functional scheme of a circuit that generates the quantization block threshold of the scheme shown in FIG. 2.
Figure 7:
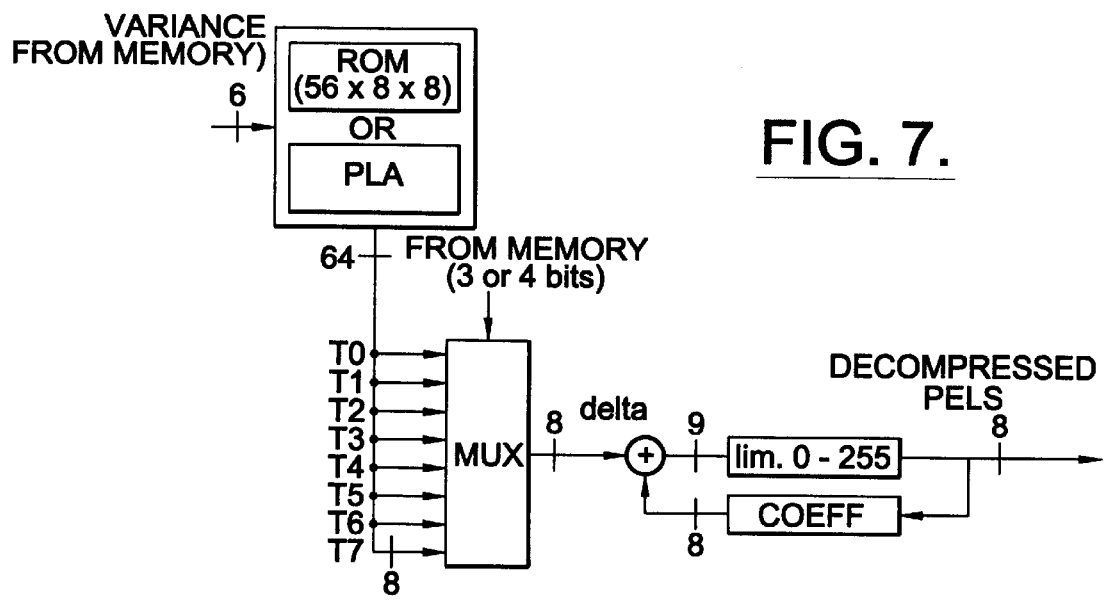
FIG. 7 shows the scheme of the ADPCM decoding and decompression circuit.

Turning now additionally to FIGS. 5–7 the ROM (Read Only Memory) block may include 56 rows each of 8 columns (8 bits) as indicated in the illustrated example. In this read only programmable memory (non volatile) are stored the coefficients of luminance and chrominance quantization. Indeed, for example, the luminance is 4 bit coded, meaning that each word selects one amongst 16 possible coefficients of a line that is selected by the VARIANCE ESTIMATOR. These coefficients are symmetric in respect to zero thus the rows contain absolute value coefficients (8 rather than 16). As an alternative to the use of a programmable ROM, it might be less expensive in terms of the area of silicon utilized to use a programmable logic array PLA that receives as an input certain variance value and outputs the values of the required coefficients. The PLA may be arranged in AND, OR, NOT gates such as to carry out the Boolean conversion of the variance in a plurality of coefficients.

The DPCM compression network, that generates a predictor value to be applied to the relative input of the differentiator, is made of a two-input multiplexer (MUX) To the first input of the multiplexer is applied the value of the first pel (Al) of each sub-block of I_DCT input data, whereas the predictor value, generated by the network, is applied to the other input. The adder (+) receives through a first input the output of the quantizer circuit (QUANTIZER) to be added to the output value of the multiplexer (MUX). The result of this sum is applied to the input of a limiter circuit (LIM. 0–255), whose output stream is supplied to the input of a predictor value (COEFF) generating circuit.

The limiter stage (LIM. 0–255) may be provided by combinational logic circuit. The use of such a stage is necessary for compressing eventual maximum pixel values beyond a given limit, which, in the case of 8 bit coding of pixel values, may be fixed at 255. Indeed during the compression and decompression phases, the pixel value may occasionally exceed the limit of 255 and in such a case the limiter circuit restores the maximum value of the pixel within the set limit. A three bit write coding (CODER) circuit for I_DCT chrominance data and four bit coding circuit for luminance I_DCT data receive the output stream of the quantizer circuit and write the so-recompressed data in the respective buffers of the external memory.

With the purpose of better illustrating the functions of the coding and ADPCM recompression block, a detailed description follows explaining the various block functions.

ADPCM RECOMPRESSION

Let I be a digital picture represented by a matrix of M rows and N columns of pixels, and let I(x, y) the pixel defined by the row y and the column x, defined as an integer number by a number B of bits (binary figures). Let picture I be subdivided in rectangular blocks having an R×C size (R rows and C columns). The maximum efficiency for the compression is obtained if R and C are chosen among the integer dividers of M and N, respectively.

The algorithm carries out a compression of each block, that is a reduction of the number of bits necessary for representing the block itself, exploiting just the data extracted from the block itself, this with the aim of simplifying the access to the block in the stream of compressed data and also the decompression of the block itself. The ADPCM compression mechanism exploits the correlation existing among adjacent pixels of a picture so to reduce the number of necessary bits for the binary description of the picture itself. It is indeed possible to approximate the value of a pixel by appropriately combining only the values of the pixels adjacent to it (without thus using the value of the pixel itself), so to create what is commonly referred to as a "prediction" of the pixel.

Figure 8:
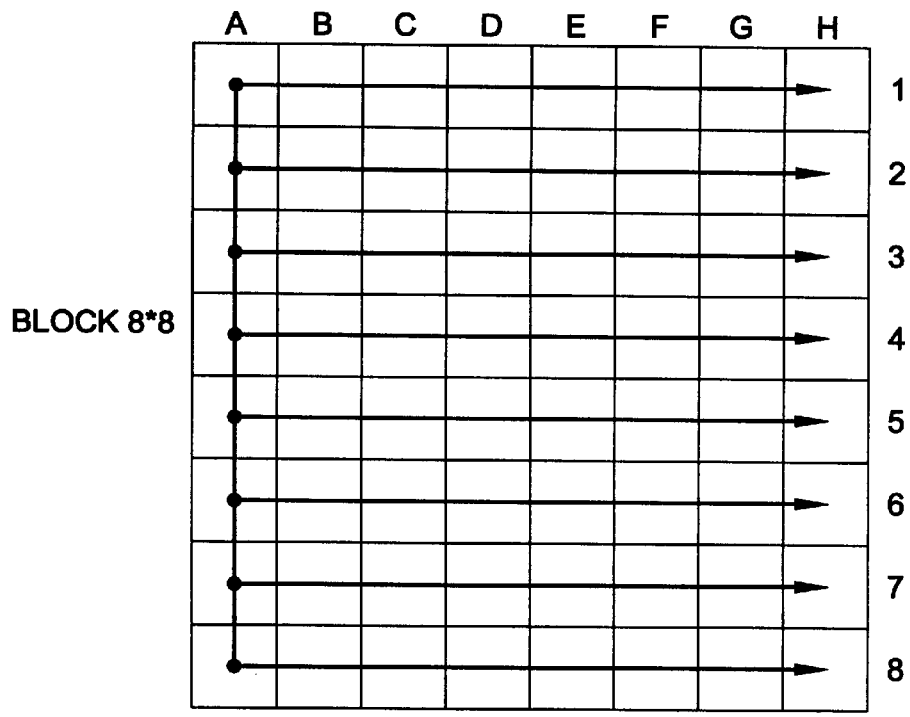
FIG. 8 shows the scanning of a 8*8 block of I-DCT data.

It is therefore possible to reduce the amount of binary figures necessary for a digital representation of a picture by defining the prediction mechanism and therefore by appropriately coding, rather than each pixel, only the prediction error. The more precise the prediction of the pixel's value, the lower the entropy of the prediction error, that, the lower the number of bits necessary for coding the latter. Considering for example an arrangement for the scanning of the pixels of each block according to the scanning scheme shown in FIG. 8, such that, for each pixel with the exception of the first there exists another, preceding it that may be used as the predictor of the pixel itself. Let $P(i, j)$, $i=1, \ldots, C$ be the pixel defined by the row i and the column j of whichever block, and let $P'(i, j)$ be the pixel used as predictor of $P(i, j)$ then by referring to the scheme of FIG. 8, the arrangement is defined as follows:

* $P(1, 1)$=first pixel of the scanning
* $P'(i, 1)=P(i-1, 1)$; $i=2, \ldots, R$
* $P'(i, j)=P(i, j-1)$; $i=1, \ldots, R$ and $j=2, \ldots, C$ Let $E(i, j)=P(i, j)-P'(i, j)$ be the prediction error. It is known that the whole of the prediction errors has a statistic representation that can be well approximated to a sequence of independent casual variables and identically distributed and having a Laplacian probability density. By exploiting this knowledge in advance of the prediction error it is possible to compress the latter by mapping it on a small group of values $Q(k)$, $k=1, \ldots$ ; L and $L<2^B$ without introducing an excessive distortion. This mapping operation is commonly named "quantization". Supposing that each of the L values $Q(k)$ can be coded with a number of bits C less than B (always true when for example $L \leq 2^C$) the binary coding of each pixel subjected to the predictive process is compressed by a factor C/B.

The ADPCM compression method is applied to each block into which the picture is decomposed through the following operations: selecting and coding an appropriate quantizer in the digital stream; coding of the first pixel of the block; and decorrelating, quantizing and coding of all the remaining pixels of the block. The various steps and the circuit architecture that carry out these operations are hereinbelow singularly described:

1) Selection and Coding of the Quantizer

It is well documented that the distortion introduced by the process of quantization may be reduced if the set of quantization values is calculated by taking into account the energy of the signal to be quantized. It is also known that different portions of a digital picture may present very different energy values. The present method defines the whole of the values Q(k) relative to each block as a function of the energy of the block itself as follows:

the whole of the values Q1(k)k=1, . . . , L utilized in the case of unitary energy are known both to the coder and to the decoder;

the U energy of the block is estimated and coded in the digital stream; and the values Q(k) effectively used by the block are calculated as:

$$Q(k)=Q1(k)*U;k=1,\ldots,L$$

An estimation of the block energy may be made in a relatively simple way by hypothesizing a Laplacian statistic of the prediction error. Indeed, in this case the energy may be calculated by multiplying by the square root of two the mean of the absolute values of the block prediction errors. The coding of the energy may be simply done by scaling in terms of the maximum value and by representing the result on a K number of bits, so to basically realize a uniform quantization. In selecting the quantizer of the prediction errors it is also necessary to take into consideration the peak value of the errors of quantization, because in the case of large prediction errors it might occur that the peak restitution value of the quantizer, according to the scheme shown hereinbelow, be too small. Thus, simultaneously to the calculation of the variance, the peak values of the prediction for the first column error are also calculated, within which, large prediction errors are likely to occur because of the greater distance among the lines of a field during the interlaced scanning, and for each group of G consecutive horizontal lines (i.e. G=2). A bit is added to the coding of each of these groups of pixels in order to signal the event of an excessive peak of prediction error, and as a result of it, the choice of a quantizer that corresponds to a 2*U energy in the case of a pair of rows and to 4*U in the case of the first column. A circuit architecture as that illustrated in details in FIGS. 3 and 4 may be used for calculating this variance estimation.

2) Coding of the First Pixel of the Block

By referring to the scheme of FIG. 2, the first pixel of the block, previously indicated as P(1, 1), is not subject to any sort of prediction, thus it is coded according to its original resolution by way of B bits.

3) Decorrelation, Quantization and Coding of all the Other Pixels of the Block

By referring to the scheme of FIG. 2, for each pixel of the block, the pixel P' as previously defined will be adopted as the predictor. It should be noticed that this predictor, according to the scanning order of FIG. 8 previously described in detail, has already been quantized and reconstructed, and therefore is not taken from the original picture. This permits a better control of the picture's quality, coherently with known ADPCM techniques.

FIG. 2 shows a circuit where, besides giving a general view of the encoder, also provides details of the prediction and quantization loop of single pixels. The calculation of the prediction error is carried out in terms of modulus and sign. This permits to simplify the quantization, by halving the number of levels upon which the quantization operates. Indeed, it is known that the statistics of the prediction error is symmetric about the zero.

FIGS. 5 and 6 illustrate a circuit embodiment of the quantizer. The scheme of FIG. 5 shows the architecture used for generating the seven threshold values S0, S1, S2, S3, S4, S5 and S6 that represent the arithmetic mean of the restitution values T0, . . . , T7. In particular, the mean is calculated among adjacent restitution values (i.e. S2=T2+T3) and this result is not divided by 2 to maintain full accuracy. Of course this is compensated by multiplying by 2 the "err" value of the scheme of FIG. 6 which is in fact represented with 9 bits (i.e. 1 sign bit is added) rather than with 8 bits. FIG. 6 shows the real quantization circuit.

The threshold values calculated in FIG. 5 define a series of eight intervals of absolute value (and for the coding of the luminance with four bits), thus if "err" falls within the interval defined by S1 and S2 then "err" is replaced by the value T2 previously produced by either the PLA or by reading the ROM. Therefore, the two comparators fed with S1 and S2 drive, with the assistance of a combinatory logic, the multiplexer MUX in transferring T2 to the output, taking on the name "delta". The sign bit of "err" instead is transferred untrimmed to the output and in any case becomes the sign of "delta".

By referring again to the complete scheme of the ADPCM coder of recompression and writing on the video RAM of FIG. 2, the data so recompressed are stored in the external DRAM, which is organized in 16 bit words. Thus, the N bits that represent the coding, for example of an 8*8 block of luminance, are aligned in 16 bit words and sent, by the use of the memory controller of FIG. 1, to the external DRAM memory. Obviously N is not a multiple of 16 bits, thus a 16 bit word does not contain useful information and it is therefore convenient to store such a word in a memory of small dimensions (as compared to those of the external DRAM) that can be realized on the chip. This particularly advantageous form of realization is indicated in the scheme of FIG. 1 by the presence of a so-called ADPCM Memory block that represents such an auxiliary optional memory integratable on the decoder chip.

The architecture of the ADPCM Decoder block of the scheme of FIG. 1 is shown in detail in FIG. 7. Let us suppose the read from the memory the N bits as referred to above. The variance as calculated therefrom selects, that is aims one of the stored values, a value stored in the ROM (or the PLA). Therefore, the values T0, T1, T2, T3, T4, T5, T6, and T7 are produced, which feed the multiplexer MUX. Subword of 4 bits (in the case of luminance decompression) are drawn from the N bits and they drive the MUX in selecting the T values. Finally, the current T value, besides becoming the decompressed pel, also becomes the value to be added to the next value selected by the MUX. This process is initialized by the first pel of the 8*8 block which is not affected by the compression.

EXAMPLE OF COMPRESSION WITH N BITS PER PIXEL

By referring to the example of FIGS. 2–7, let us consider an R*C block of pixels after eventual motion compensation.

The total number of bits utilized for the compression of the block:

$$K+8+(R*C-1)*N+1+R/G$$

where: K=bits employed for coding the energy, 8=bits used for the first scanned pixel, N=bits used for the quantization, (R*C-1)*N=bits employed for the DPCM coding of the remaining pixels, 1=bit for indicating the altered quantizer in the first column, and R/G=bit for indicating the altered quantizer in the R/G groups of rows.

For the case K=6, R=8, C=8, N=4, G=2 we obtain a total of:

6+8+(8*8−1)*4+1+8/2=271 bit/block

In the case K=6, R=8, C=8, N=3, G=2 we obtain a total of:

6+8+(8*8−1)*3+1+8/2=208 bit/block compared to the 8*8*8=512 required by the original representation.

EXAMPLE OF COMPRESSION OF AN MPEG MACROBLOCK

Each macroblock is made up of four 8*8 blocks of luminance and of two 8*8 blocks of chrominance; each macroblock is coded with a number of bits equal to:

$$(4 * 8 * 8 * 8) + (2 * 8 * 8 * 8) = 3.072 \text{ bits}$$
$$\text{luma} \qquad \text{chroma}$$

In each picture there are 1620 macroblocks:

3.072*1.620=4976640 bits

It is known that the chrominance signal has a lower content of presenting a band restricted to the lowest spatial frequencies. This implies a greater predictability of the chrominances themselves, that is, a greater efficiency of the ADPCM compression. By considering a 4 bit/pixel compression for the luminance and a 3 bit/pixel for the chrominance the memory requisite becomes:

$$(4 * 271) + (208 * 2) = 1.500 \text{ bits}$$
$$\text{luma} \qquad \text{chroma}$$

Therefore, each frame occupies:

1.500*1.620=2.430.000

The macroblock compression factor so obtained is equal to 2.408, thus allowing to achieve a 50% compression of each macroblock.

EXAMPLE OF APPLICATION TO AN MPEG DECODER

By taking into account the above relationships it is possible to reach the target for a reduction to 8 Mbits of the video memory register by assuming a 50% recompression of the MPEG decompressed I and P pictures. This result is attained by recompressing the I and P picture after the MPEG decompression and before they are stored in the external memory. They will be then decompressed when reading them from the external memory, as shown in FIG. 1. The compression is applicable to an 8*8 block output from the I_DCT and motion compensation pipeline, according to an adaptive type DPCM scheme. In particular, in the considered example, for the 8*8 blocks of luminance a 4 bits compression is selected, whereas for the 8*8 blocks of chrominance a 3 bits compression is selected. Thus, the memory requisite is as follows:

1,835008 + 835,584 + 2,430,000 + 2,430,000 = 7,716,352 bits
       |     |
       |   50% compressed P buffer
    50% compressed I buffer The remaining 672,256 bits (to a 8/Mbits DRAM capacity) are available to accommodate an audio buffer and for the requisites of a display unit system (OSD).

REDUCTION OF THE READ BAND OF THE EXTERNAL MEMORY ACCORDING TO A PREFERRED EMBODIMENT OF THE INVENTION

As illustrated in the above example, the number of bits required for the coding of a compressed 8*8 block of luminance is 271 bits. With the aim of modifying as little as possible the existing architecture of the memory controller, shown in the scheme of FIG. 1, and considering that at present the functioning of these systems is optimized for reading and writing of 256 bit blocks, according to a preferred embodiment of the invention it is definitely advantageous to store 271−256=15 bits for each block in a dedicated local memory integrated on the decoder chip. This is referred to as the ADPCM memory and is shown in the scheme of FIG. 1. It should be highlighted the fact that such an auxiliary ADPCM memory is not strictly necessary, but represents a highly preferred option because of the additional advantages that offers and, as such, has been included in the general scheme of FIG. 1.

The dimension of this auxiliary ADPCM memory for a single frame may therefore be of:

1.620*4*15=97.200 bits per frame

This amount takes into account that in a PAL picture there exist 1,620 macroblocks, each of which contains four 8*8 blocks, each of which is characterized by the 15 bits as defined above. This calculation result must be doubled because the I and P pictures are recompressed according ADPCM techniques. The result of this is that the capacity of the ADPCM memory, where it is present, should be of 194,400 bits.

An example showing how it is possible to reduce the number of cycles for the reading of a predictor as compared to the case of a known system, for a particular critical case, is described hereinbelow.

READING OF A PREDICTOR FROM THE VIDEO MEMORY

In order to perform a motion compensation process according to the MPEG standards, it is necessary to read from the external memory predictors constituted at the most by 16*16 pels. According to a normal implementation followed by the controller of the external video memory, the process is based upon the reading of the pels and of some surrounding ones according to the particular page format in which the external memory is typically arranged. This is a stringent condition that implies reading data in excess of those really required.

Figure 9:
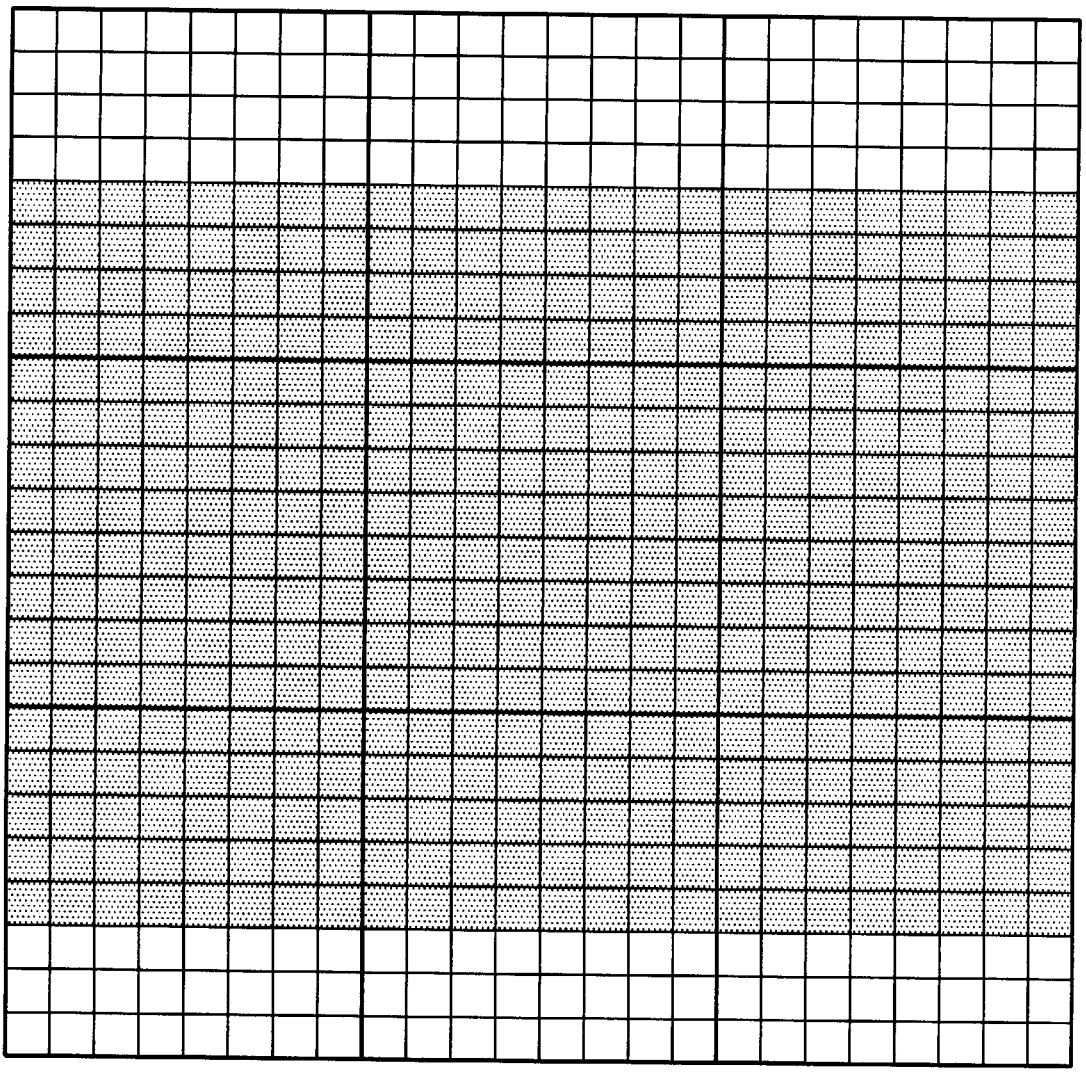
FIGS. 9 and 10 illustrate the different cases of picture reconstruction.

For example, to read a predictor, 408 8 bit coded pels (compressed) are read for the luminance component utilizing 63*3 primary clock cycles. This situation is shown in FIG. 9 where the pels are highlighted with a gray shading.

Figure 10:
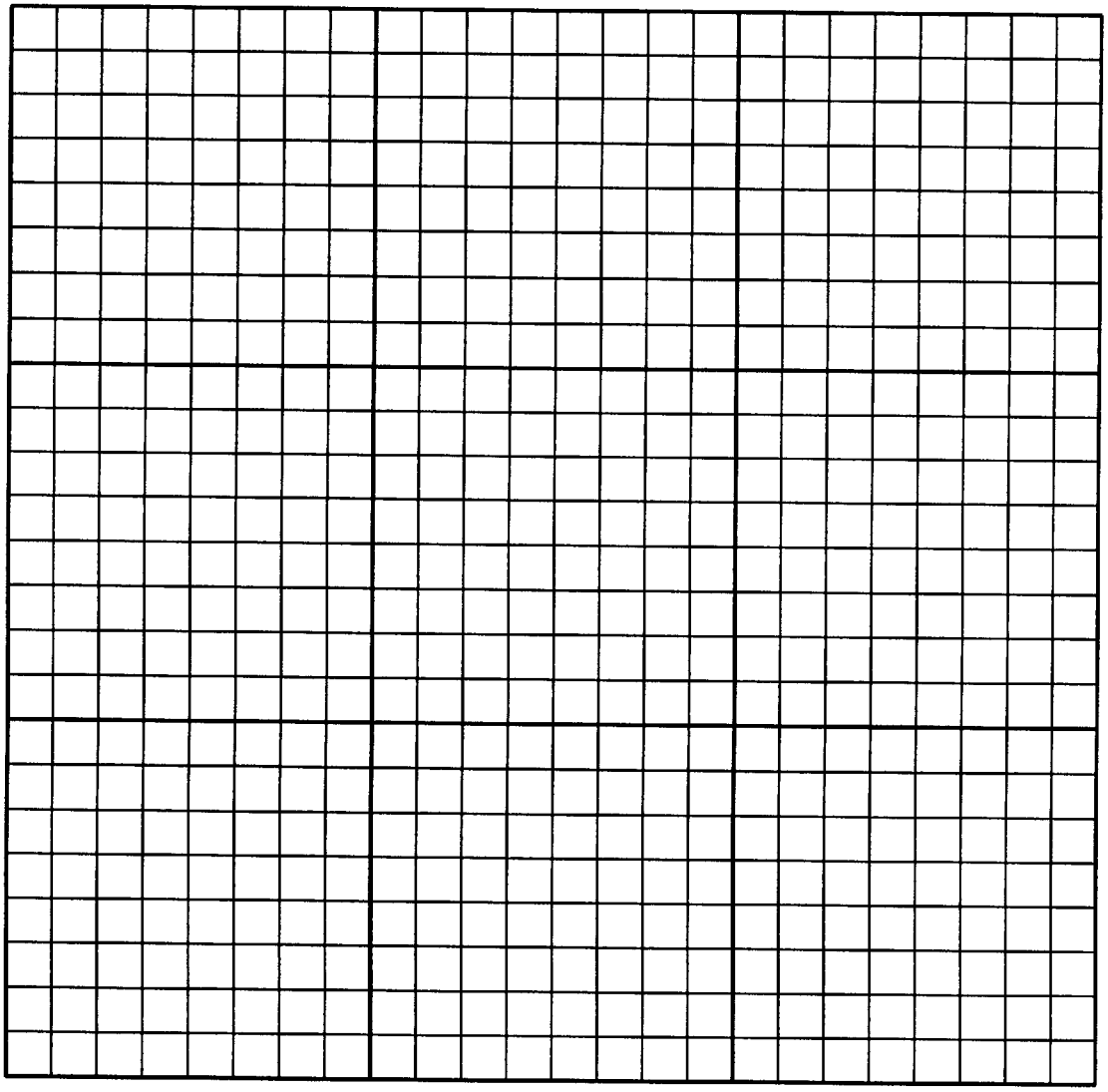

In the case of a preferred embodiment of this invention that contemplates also the presence of an ADPCM auxiliary memory in the chip and in which ADPCM compressed data is read, from the memory, whereby each 8*8 luminance block is coded with 4 bits, 576 pels belonging to the 8*8 blocks containing the prediction area are read (as shown in FIG. 10) from the external DRAM memory. In this case, 48*3 primary clock cycles are necessary. In order to complete each of these blocks the remaining 15 bits are read from the internal ADPCM Memory of FIG. 1.

Beyond this preferred embodiment, it is in any case demonstrated that despite the fact that according to the present invention the pels read are 576 compared to 408 in case of no compression, thanks to the compression itself the total bits read from the memory decrease and so does the number of clock cycles necessary for said reading.

DEFINITION OF THE CAPACITY OF AN OPTIONAL INTERNAL ADPCM MEMORY

Luminance

Let T be the total number of bits necessary for coding an 8*8 block of luminance compressed according to an ADPCM scheme. The outcome will be:

$$2^n \leq T \leq 2^{n+1}$$

where n is greater or equal to 1.

The number of bits in excess, for each block is equal to (T−2$^n$), as a consequence the ADPCM memory may have a capacity equal to:

$$1.620 * 4 * (T - 2^n) * 2 = L$$

| | | | I and P pictures |
| | | | number of bits in excess = 15 if T = 27 and n = 8 |
| | | luma blocks for each macroblock |
| | macroblocks in a picture |

Chrominance

Let S be the total number of bits necessary for coding an 8*8 block of compressed ADPCM chrominance data. The outcome will be:

$$2^m \leq S \leq 2^{m+1}$$

where m is greater or equal to 1, and is equal or different from n.

The number of bits in excess, for each block is equal to (S−2$^m$), as a consequence the ADPCM memory may have a capacity equal to:

$$1.620 * 2 * (S - 2^m) * 2 = C$$

| | | | I and P pictures |
| | | | number of bits in excess |
| | | luma blocks for each macroblock |
| | macroblocks in a picture |

In conclusion, the internal memory may have a capacity given by: L+C approximated to the power of two greater or equal to L+C.

We claim:

1. A method for reducing requirements for a video memory of an MPEG-2 decoder comprising a decompression stage for at least the respective I and P images and where the data relative to these images are stored in respective buffers organized in the video memory, the method comprising the steps of:

decompressing at least the I and P images using the MPEG-2 decoder;

recompressing the I and P images after the MPEG-2 decompression and before storing the relative data in the buffers of the video memory, estimating the variance of each block of n*m pels relative to a discrete cosine transform of decompressed image data, multiplying a value of the variance of each block by a set of coefficients while configuring a multilevel adaptive quantizer, and coding a first pel of each block with a p number of bits, the estimated value of the variance with a n-h number of bits, where h is an integer number greater than zero, and the differences between each other pel following the first pel and the average value of all the pels of the block with p-k number of bits, where k is an integer number greater than zero, according to an adaptive pulse code modulation (ADPCM) scheme;

storing the so-coded data relative to the ADPCM recompressed I and P images in respective buffers of the video memory; and decoding the stored data relative to the ADPCM recompressed I and P images, and decompressing the images according to an ADPCM scheme for display.

2. The method according to claim 1, further comprising the step of preventively subdividing each block of n*m pels into two sub-blocks of (n/2)*m pels and carrying out the ADPCM recompression, coding and decoding, and ADPCM decompression on said sub-blocks.

3. A method for reducing requirements for a video memory of an MPEG-2 decoder comprising a decompression stage for at least the respective I and P images and where the data relative to these images are stored in respective buffers organized in the video memory, the method comprising the steps of:

decompressing at least the I and P images using the MPEG-2 decoder;

recompressing the I and P images according to an adaptive pulse code modulation (ADPCM) scheme and after the MPEG-2 decompression;

storing the so coded data relative to the ADPCM recompressed I and P images in respective buffers of the video memory;

decoding the stored data relative to the ADPCM recompressed I and P images; and decompressing the decoded images according to an ADPCM scheme for display.

4. An MPEG-2 video decoder for interfacing with a control bus and a data bus through which video data are written and read in respective external memory buffers, said MPEG-2 video decoder comprising:

a core comprising a first-in-first-out buffer for data acquisition and writing in a first buffer of an external DRAM memory; a controller; a start code detecting circuit synchronized by the controller; a bi-directional buffer for on screen display data; a variable length decoder for a compressed data input stream; an MPEG-2 decompression block for the data decoded by said variable length decoder and comprising run length decoder, an inverse quantizer circuit, an inverse discrete cosine transform processor, a predictor generating circuit, a macroblock to raster scan conversion circuit for a current B-image upstream of a display unit;

a coding and recompression circuit according to an adaptive differential pulse code modulation (ADPCM) scheme of a differential type for recompressing decompressed I and P images and for coding data to be stored in the respective buffers of the external memory;

a decoding and decompressing circuit accordingly to an ADPCM scheme for the stored data relative to the recompressed I and P images read from the respective buffers of the external memory for generating a stream of decoded and decompressed data relative to I and P images; and means for motion compensation of B-images and for converting macroblocks to raster scan.

5. The decoder according to claim 4, wherein said coding and recompression circuit comprises:

a buffer for the acquisition of blocks of decompressed inverse discrete cosine transform (I_DCT) data produced by said MPEG-2 decompression block;

a circuit for estimating the energy content of said buffer and for generating a digital value of a variance of pel values of a block of I_DCT data to be stored in a respective buffer of the external memory;

programmable means for storing a plurality of pre-established digital values selected by the digital value of variance read from the external memory;

a multilevel quantizer circuit coherently conditioned by the digital value selected by the current value of the variance;

a differentiating circuit for receiving through a first input a stream of I_DCT decompressed data block and through a second input a predictor value, and for outputting a stream of data input to the inverse quantizer circuit;

a write coding circuit of ADPCM recompressed data in the respective memory buffers for receiving as input the output stream of said inverse quantizer circuit; and a generating circuit for the predictor value comprising a multiplexer receiving through a first input the decompressed I_DCT data stream and through a second input the predictor value generated by the circuit, an adder receiving through a first input the output of said inverse quantizer circuit and through a second input the output of said multiplexer and outputting a stream of summed data, a limiting circuit receiving through an input said stream of summed data produced by said adder, followed in cascade by a circuit that generates the predictor value whose output is fed to a second input of said differentiating circuit and of said multiplexer.

6. The decoder according to claim 5, wherein said programmable means comprises a read only memory.

7. The decoder according to claim 5, wherein said programmable means comprises a programmable logic array.

8. The decoder according to claim 5, further comprising means for storing part of ADPCM recompressed data within the decoder.

9. The decoder according to claim 6, wherein said storing means comprises a RAM memory of 194,400 bit capacity.

10. An MPEG-2 decoder comprising:

a video memory comprising a plurality of buffers;

a MPEG-2 decompression stage for at least the respective I and P images, the data relative to these images being stored in respective buffers of said video memory;

means for recompressing the I and P images according to an adaptive pulse code modulation (ADPCM) scheme and after the MPEG-2 decompression;

means for storing the so coded data relative to the ADPCM recompressed I and P images in respective buffers of the video memory; and means for decoding the stored data relative to the ADPCM recompressed I and P images and for decompressing the images according to an ADPCM scheme for display.

* * * * *